United States Patent
Ohkoshi et al.

(10) Patent No.: US 7,708,902 B2
(45) Date of Patent: May 4, 2010

(54) MAGNETIC MATERIAL, AND MEMORY AND SENSOR USING SAME

(75) Inventors: Shin-ichi Ohkoshi, Tokyo (JP);
Kazuhito Hashimoto, Yokohama (JP);
Shunsuke Sakurai, Yokohama (JP);
Shiro Kuroki, Tokyo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 869 days.

(21) Appl. No.: 11/521,395

(22) Filed: Sep. 15, 2006

(65) Prior Publication Data

US 2007/0218319 A1 Sep. 20, 2007

(30) Foreign Application Priority Data

Mar. 17, 2006 (JP) .............................. 2006-075494
Aug. 22, 2006 (JP) .............................. 2006-224954

(51) Int. Cl.
*C04B 35/26* (2006.01)
*C01G 49/08* (2006.01)
*G01K 7/00* (2006.01)
*G11B 5/33* (2006.01)

(52) U.S. Cl. ................. 252/62.58; 252/62.56; 374/163; 428/812; 428/810

(58) Field of Classification Search .............. 252/62.58, 252/62.56; 374/163; 428/810, 812
See application file for complete search history.

(56) References Cited

OTHER PUBLICATIONS

J. Jin et al., "Giant Coercive Field of Nanometer-Sized Iron Oxide", Adv. Mater. 2004, vol. 16, No. 1, Jan. 5, 2004, pp. 48-51.
J. Jin et al., "Formation of spherical and rod-shaped $\epsilon\text{-}Fe_2O_3$ nanocrystals with a large coercive field", J. Mater. Chem., 2005, vol. 15, pp. 1067-1071.
S. Sakurai et al., "Reorientation Phenomenon in a Magentic Phase of $\epsilon\text{-}Fe_2O_3$ Nanocrystal", Journal of the Physical Society of Japan, vol. 74, No. 7, Jul. 2005, pp. 1946-1949.

*Primary Examiner*—C. Melissa Koslow
*Assistant Examiner*—Matthew E Hoban
(74) *Attorney, Agent, or Firm*—Clark & Brody

(57) ABSTRACT

A magnetic material composed of $\epsilon\text{-}In_xFe_{2-x}O_3$ (wherein $0<x\leq0.30$) crystal in which In is substituted for a portion of the Fe sites of the $\epsilon\text{-}Fe_2O_3$ crystal. The crystal exhibits an X-ray diffraction pattern similar to that of an $\epsilon\text{-}Fe_2O_3$ crystal structure and has the same space group as that of an $\epsilon\text{-}Fe_2O_3$. The In content imparts to the magnetic material a magnetic phase transition temperature that is lower than that of the $\epsilon\text{-}Fe_2O_3$ and a spin reorientation temperature that is higher than that of the $\epsilon\text{-}Fe_2O_3$. The In content can also give the magnetic material a peak temperature of the imaginary part of the complex dielectric constant that is higher than that of the $\epsilon\text{-}Fe_2O_3$.

11 Claims, 8 Drawing Sheets

50 nm 50 nm 50 nm

MAGNETIC MATERIAL, AND MEMORY AND SENSOR USING SAME

FIELD OF THE INVENTION

The present invention relates to an $\epsilon$-$Fe_2O_3$ system magnetic material, and to a magnetic memory and temperature sensor using the magnetic material.

DESCRIPTION OF THE PRIOR ART

To increase the recording density of magnetic recording media, the magnetic particles concerned have to be made smaller and isolated. However, there is particular emphasis on maintaining a stable recording state as the size of the magnetic particles decreases. Specifically, the minimum unit of the magnetic energy ($K_U \times V$) of the cluster of magnetic particles constituting a recording bit has to be far larger than the thermal energy ($k_B \times T$) acting to disrupt the recording. Here, $K_U$ is the magnetic anisotropy energy constant, V is the volume of the magnetic cluster, $k_B$ is the Boltzmann constant, and T is absolute temperature (K). The ratio ($K_U \times V$)/($k_B \times T$) is generally used as an index of the ability to stably maintain the recording state, with the aim being to achieve a ratio of about 60 or more in order for the recording to last up to 10 years.

To advance the development of magnetic recording media capable of higher recording densities, the focus more or less has to be on decreasing the magnetic cluster volume V and increasing the magnetic anisotropy energy constant $K_U$. The relationship between $K_U$ and the coercive force Hc is $K_U \propto Hc$, which means that the higher the target recording density is, the greater the Hc of the magnetic material has to be.

The present inventors had succeeded in synthesizing, at room temperature, a single phase of $\epsilon$-$Fe_2O_3$ nanoparticles that exhibit a huge Hc of 20 kOe ($1.59 \times 10^6$ A/m) as we described in Reference 1 (Jian Jin, Shinichi Ohkoshi and Kazuhito Hashimoto, Advanced Materials 2004, 16, No. 1, January 5, pp. 48-51), Reference 2 (Jian Jin, Kazuhito Hashimoto and Shinichi Ohkoshi, Journal of Materials Chemistry 2005, 15, pp. 1067-1071) and Reference 3 (Shunsuke Sakurai, Jian Jin, Kazuhito Hashimoto and Shinichi Ohkoshi, Journal of the Physical Society of Japan Vol. 74, No. 7, July, 2005, pp. 1946-1949). It is known that while the crystal structures of materials may be composed of $Fe_2O_3$, it exists in different forms, of which the most common are $\alpha$-$Fe_2O_3$ and $\gamma$-$Fe_2O_3$, and that $\epsilon$-$Fe_2O_3$ is another such form. However, as described in the References 1 to 3, the crystalline structure and magnetic properties of $\epsilon$-$Fe_2O_3$ have been clarified only very recently. With its huge Hc, this $\epsilon$-$Fe_2O_3$ is expected to be applied to the aforementioned high-density magnetic recording media.

For magnetic materials that already possess a high Hc to be put to practical use as a recording medium requires a magnetic head that generates a strong enough magnetic field to write information to the medium. Generally, the magnetic field generated by a magnetic head is proportional to the saturation magnetic flux density of the soft magnetic film used in the head. Currently, hard disks are reported to have an Hc in the order of 1.5 to 4.5 kOe ($1.19 \times 10^5 \sim 3.58 \times 10^5$ A/m), but the magnetic heads used to write to these hard disks use materials having a high saturation magnetic flux density of 2.4 T.

Therefore, even if the $\epsilon$-$Fe_2O_3$ having the huge Hc in the order of 20 kOe ($1.59 \times 10^6$ A/m), as described in the above references, were to be used as the material of a magnetic recording medium, it would not be possible to actually record on the medium unless there existed a material having a saturation magnetic flux density that was even higher than that of current materials. In other words, current magnetic head materials could not record data on the magnetic material described in the references.

Methods of getting around this problem include thermally-assisted magnetic recording and magneto-optical recording. However, to enable magnetic materials to be applied to these recording techniques, it is necessary to be able to control the temperature at which the state in which the spontaneous magnetization of the material (ferromagnetism, ferrimagnetism and other magnetic ordering) changes to paramagnetism (hereinafter referred to as the magnetic phase transition temperature), and for the material to have a high temperature dependency, in particular, for the Hc to rapidly decrease as the temperature rises.

With its nano-order particle diameters and huge Hc, the $\epsilon$-$Fe_2O_3$ described in References 1 to 3 is expected to be utilized for ultrahigh-density recording media. However, the very hugeness of the Hc means that existing magnetic heads are unable to write to such recording media, and it is also unclear whether the material can be immediately applied to thermally-assisted magnetic recording and magneto-optical recording. That is to say, even if laser heating or the like is used to reduce the huge Hc to make it possible to record data on the material, the $\epsilon$-$Fe_2O_3$ has a high magnetic phase transition temperature of 222° C. (495 K), which poses a problem from the standpoint of the head-disk interface. Even if the head-disk interface problem is solved, it is important to be able to control the magnetic phase transition temperature in order to provide more system design freedom.

On another front, in recent years there has arisen a demand, in superconducting materials research and other research areas, for precision temperature control technology at sub-zero temperatures. Such temperature control technology could be advanced if there were temperature sensors able to sensitively detect temperature changes in specific temperature regions.

The object of the present invention is to obtain a magnetic material that maintains the high magnetic properties of the $\epsilon$-$Fe_2O_3$ described in the above References 1 to 3 while at the same time can be applied to thermally-assisted magnetic recording and magneto-optical recording techniques by studying ways of decreasing the magnetic phase transition temperature, and can also be applied to sensors able to sensitively detect temperature changes in low-temperature regions.

SUMMARY OF THE INVENTION

The present inventors found that by substituting In for a portion of the Fe sites of the $\epsilon$-$Fe_2O_3$ described in References 1 to 3 without substantially changing the crystal structure, the magnetic phase transition temperature and the spin reorientation temperature are able to be controlled. Thus, the present invention provides a magnetic material composed of $\epsilon$-$In_xFe_{2-x}O_3$ (wherein $0<x \leqq 0.30$) in which In is substituted for a portion of the Fe sites of the $\epsilon$-$Fe_2O_3$ crystal, that has the same space groups as that of an $\epsilon$-$Fe_2O_3$ crystal.

Since the In-containing $\epsilon$-$Fe_2O_3$ exhibits an X-ray diffraction peak corresponding to the crystal structure of $\epsilon$-$Fe_2O_3$, that is the same space group with that of $\epsilon$-$Fe_2O_3$, it could be assumed that magnetic particles could be obtained having the same high coercive force (in the order of 20 kOe) as the $\epsilon$-$Fe_2O_3$ magnetic phase. Moreover, it was confirmed that the magnetic phase transition temperature is decreased from that of $\epsilon$-$Fe_2O_3$, and that the spin reorientation temperature is increased compared to that of $\epsilon$-Fe$_2$O$_3$, by an amount in each case corresponding to the amount of the In substitution content. This showed that the In substitution amount could be manipulated to control the magnetic phase transition temperature and the spin reorientation temperature. In addition, the peak temperature of the imaginary part of the complex dielectric constant of the In-containing $\epsilon$-Fe$_2$O$_3$ is higher than that of $\epsilon$-Fe$_2$O$_3$.

The particle diameter along the long axis of the particles of In-containing $\epsilon$-Fe$_2$O$_3$ according to the invention, as measured from a transmission electron microscope (TEM) image, is preferably from 5 to 200 nm; more preferably, the In-containing $\epsilon$-Fe$_2$O$_3$ is constituted of nanoparticles having a single domain structure. Thereby, when the particle crystals of the magnetic material are affixed to the substrate, the result is a magnetic layer suitable for high-density magnetic recording. The present invention also provides a magnetic memory in which the information is recorded on the magnetic layer using a magnetization method in which the magnetic material constituting the magnetic layer is magnetized at the process step of a temperature being lowered from a higher side to a lower side of its magnetic phase transition temperature. The invention also provides a temperature sensor comprising the magnetic material and means for measuring a magnetization intensity of the material, which detects temperature changes relative to the spin reorientation temperature of the material, using the material's characteristics that the magnetic properties are changed drastically at the spin reorientation temperature.

The invention has the following effects.

(1) In accordance with the present invention, a novel magnetic material is obtained having a magnetic phase transition temperature (corresponding to the Curie temperature) in the order of 400 to 490 K (127 to 217° C.). This transition temperature can be adjusted by adjusting the In content, making it ideal for application as a magnetic material used for thermally-assisted magnetic recording and magneto-optical recording media.

(2) The Hc of the magnetic material at room temperature is very high, which contributes to increasing the reliability of the magnetic recording medium.

(3) The magnetic material is formed of an iron oxide of up to trivalent iron, giving it very good corrosion resistance in an air environment. Conventional magneto-optical recording media that use metal-based magnetic materials have poor oxidation resistance, so the magnetic layer needs to be covered by a protective film of silicon nitride or the like. Using the magnetic material of this invention almost entirely eliminates the need to use a protective film against corrosion, making it possible to select a dielectric film with a specialized function, or to use a medium construction with no protective film.

(4) In this magnetic material, spin reorientation takes place at subzero temperatures, and the change in magnetic properties at the spin reorientation temperature is steeper than in the case of $\epsilon$-Fe$_2$O$_3$. The spin reorientation temperature can be adjusted by adjusting the In content. Therefore, the magnetic material of this invention can be used to construct a sensitive temperature sensor for subzero applications that detects changes in temperature relative to a specific temperature.

BRIEF DESCRIPTION OF THE DRAWINGS

FIG. 4 (b) is a TEM image of other In-containing $\epsilon$-Fe$_2$O$_3$ crystals of the invention.

FIG. 4 (c) is a TEM image of $\epsilon$-Fe$_2$O$_3$ crystals.

DETAILED DESCRIPTION OF THE INVENTION

Figure 1:
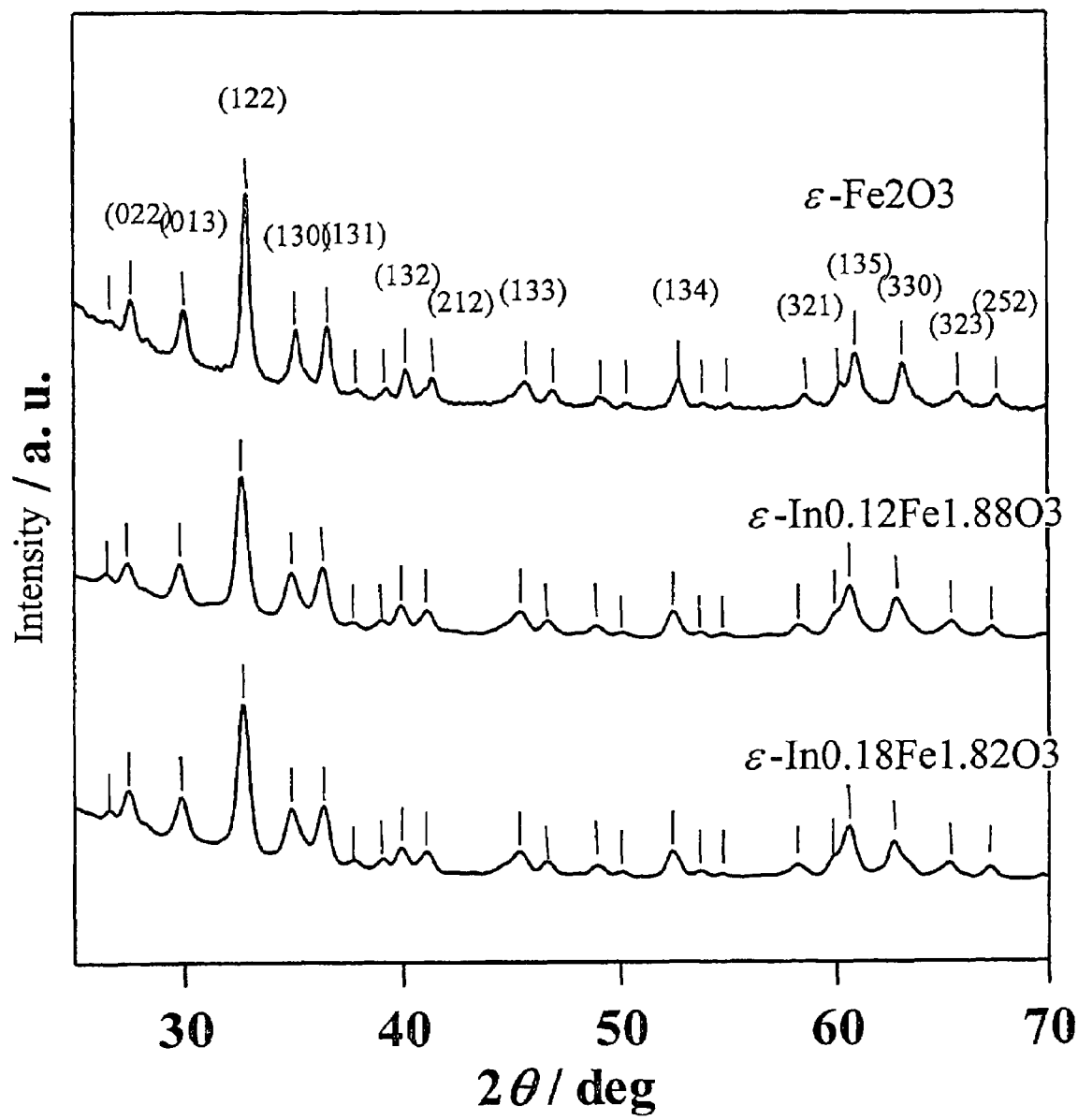
FIG. 1 shows XRD patterns of In-containing $\epsilon$-Fe$_2$O$_3$ crystals according to the present invention, and of $\epsilon$-Fe$_2$O$_3$.

As described in the References 1 to 3, the inventors used a combination of the reverse micelle method and the sol-gel method, and the application of heat treatment, to obtain a single phase of $\epsilon$-Fe$_2$O$_3$ nanoparticles. In the reverse micelle method, two surfactant-containing micelle solutions, comprising micelle solution I (starting material micelle) and micelle solution II (neutralizer micelle), are mixed together, thereby promoting the precipitation of iron hydroxide in the micelle. The sol-gel method provides the iron hydroxide particles created in the micelle with a silica coating. The coated particles are then separated from the solution and subjected to heat treatment in air at a prescribed temperature in the range 700-1300° C. to thereby obtain a single phase of $\epsilon$-Fe$_2$O$_3$ particles. Below, this is described in more detail.

Typically, iron (III) nitrate and a surfactant (cetyl trimethyl ammonium bromide, for example) is dissolved in oil-phase n-octane in the aqueous micelle solution I, and an aqueous solution of ammonia was used for the aqueous micelle solution II with oil-phase n-octane. Preferably, an appropriate amount of a nitrite of an alkaline earth metal (such as Ba, Sr, Ca, etc.) is added to the aqueous micelle solution I as a shape control agent. The presence of this shape control agent makes it possible to ultimately obtain a single phase of rod-shaped crystals of $\epsilon$-Fe$_2$O$_3$. After the two micelle solutions have been combined, the sol-gel method is used in parallel. Specifically, a silane (tetraethylorthosilane, for example) is dripped into the combined solution while the solution is stirred to promote the reaction that creates the iron hydroxide in the micelle. As a result, the surface of the iron hydroxide microparticles precipitated in the micelle is coated with silica produced by the hydrolysis of the silane. The coated particles of the iron hydroxide powder are then separated from the solution and, after being washed and dried, are placed in a furnace and heat-treated (baked) in air at 700 to 1300° C. (973 to 1573 K), more preferably 900 to 1200° C. (1173 to 1473 K), and even more preferably at 950 to 1100° C. (1223 to 1373 K). This heat treatment promotes the oxidation reaction in the iron hydroxide particles inside the silica coating, producing microparticles of $\epsilon$-Fe$_2$O$_3$. In addition to contributing to the formation of a single phase of $\epsilon$-Fe$_2$O$_3$ rather than $\alpha$-Fe$_2$O$_3$ or $\gamma$-Fe$_2$O$_3$, the silica coating prevents the particles from sintering together. The copresence of an appropriate amount of an alkaline earth metal facilitates the growth of a single phase of rod-shaped $\epsilon$-Fe$_2$O$_3$ particles.

As described in the Examples hereinbelow, the inventors found that a single phase of In-containing $\epsilon$-$Fe_2O_3$ having the same crystal structure as $\epsilon$-$Fe_2O_3$ could be synthesized by substituting indium (III) nitrate for a portion of the iron (III) nitrate dissolved in the aqueous micelle solution I, using the reverse micelle method in combination with the sol-gel method, and using heat treatment, and that the magnetic phase transition temperature and the spin reorientation temperature could be changed by adjusting the substitution amount of the In.

FIG. 1 shows XRD patterns of samples of In-containing $\epsilon$-$In_xFe_{2-x}O_3$ crystals synthesized by the above method, in which x is 0.12 and 0.18, along with $\epsilon$-$Fe_2O_3$ (x=0). As can be seen in FIG. 1, both of the In-containing $\epsilon$-$Fe_2O_3$ samples exhibit only peaks corresponding to the crystal structure of $\epsilon$-$Fe_2O_3$ (orthorhombic, space group $Pna2_1$). Calculation of the lattice constants of the samples confirmed that an increase in the substitution amount (content) of the In resulted in a uniform increase in the length of the a, b and c axes.

Figure 2:
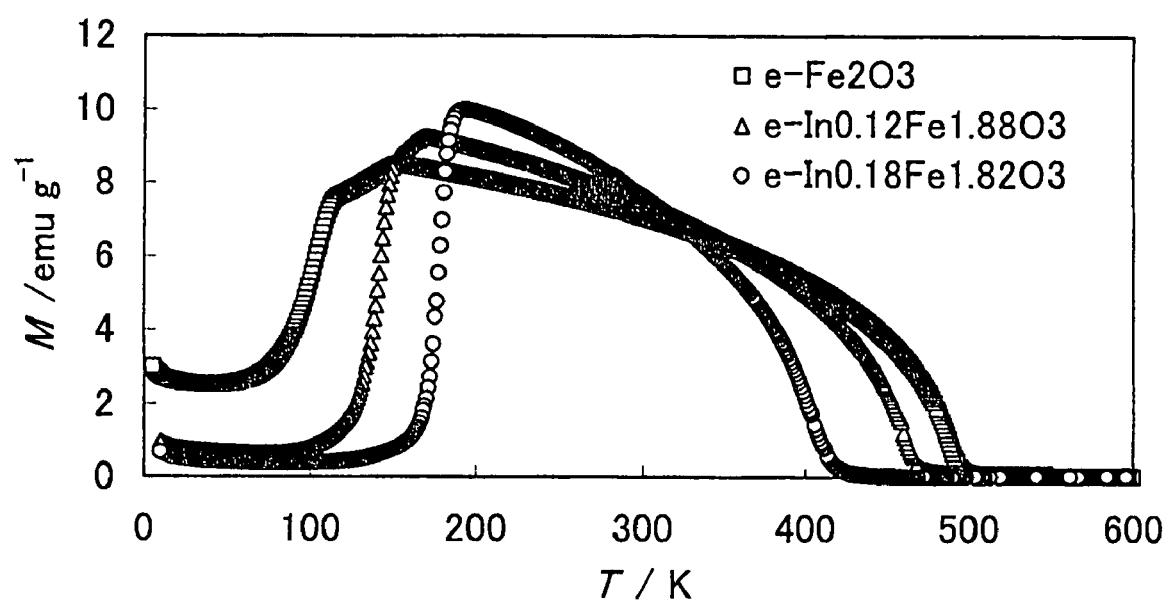
FIG. 2 shows curves of magnetization measured at various temperatures, in an external magnetic field of 1000 Oe (7.96× 10$^4$ A/m) of samples of powder particles of the In-containing $\epsilon$-Fe$_2$O$_3$ of the present invention, and of $\epsilon$-Fe$_2$O$_3$.

FIG. 2 shows curves of magnetization measured at various temperatures, in an external magnetic field of 1000 Oe ($7.96 \times 10^4$ A/m), in respect of the same samples as FIG. 1. For this, the samples were first heated to above the magnetic phase transition temperature at a temperature elevation rate of 1 K/min, then cooled at 1 K/min, while the magnetization was measured. As shown by FIG. 2, while the magnetic phase transition temperature of $\epsilon$-$Fe_2O_3$ (x=0) was 495 K, that of the In-containing $\epsilon$-$Fe_2O_3$ in which x was 0.12 was 470 K, and that of the In-containing $\epsilon$-$Fe_2O_3$ in which x was 0.18 was 422 K, the temperature declining with the increase in x. Also, while the spin reorientation temperature was 154 K in the case of $\epsilon$-$Fe_2O_3$ (x=0), that of the In-containing $\epsilon$-$Fe_2O_3$ in which x was 0.12 was 170 K, and that of the In-containing $\epsilon$-$Fe_2O_3$ in which x was 0.18 was 192 K, going up as x was increased; with the increase in x, the change in magnetization at each side of the spin reorientation temperature became steeper.

Figure 3:
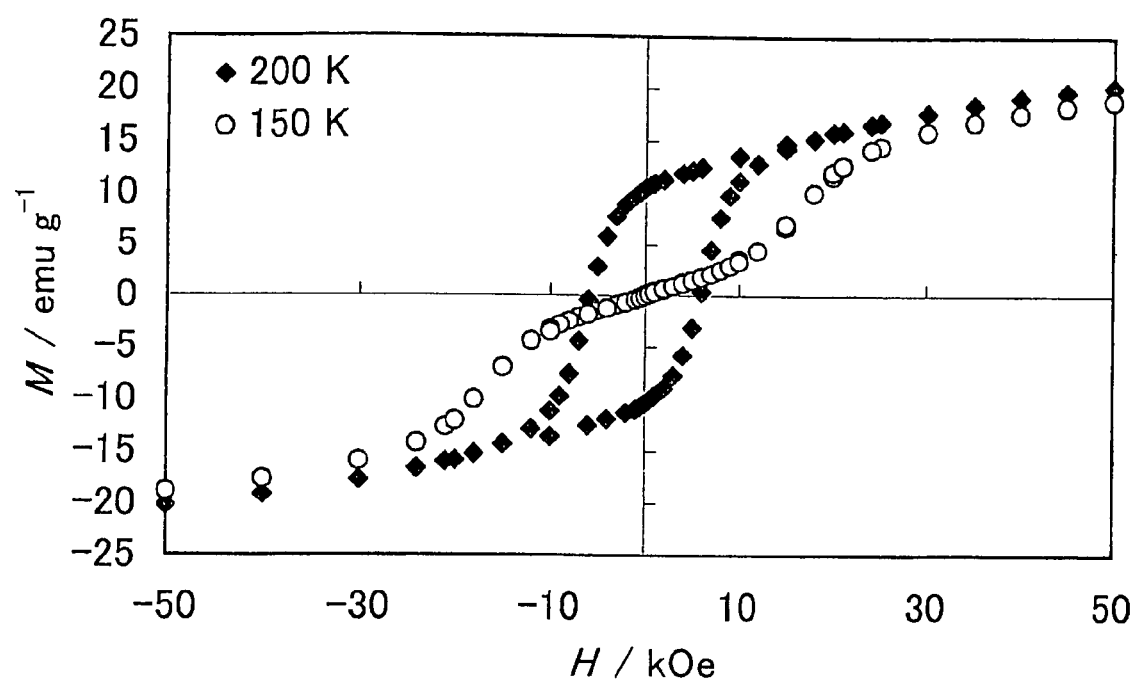
FIG. 3 are magnetization hysteresis loops of samples of In-containing $\epsilon$-Fe$_2$O$_3$ of the present invention, measured at 200 K and 150 K.

FIG. 3 are magnetization hysteresis loops in respect of samples of In-containing $\epsilon$-$Fe_2O_3$ in which x was 0.18, measured at 200 K and 150 K. While the coercive force Hc at 200 K was 6 kOe ($4.78 \times 10^5$ A/m), the Hc at 150 K was virtually zero, an antiferromagnetic transition at the spin reorientation temperature that produced a major change in the Hc. In the case of the In-containing $\epsilon$-$Fe_2O_3$ in which x was 0.18, also, the coercive force Hc at 300 K was 9 kOe ($7.16 \times 10^5$ A/m).

Figure 4:
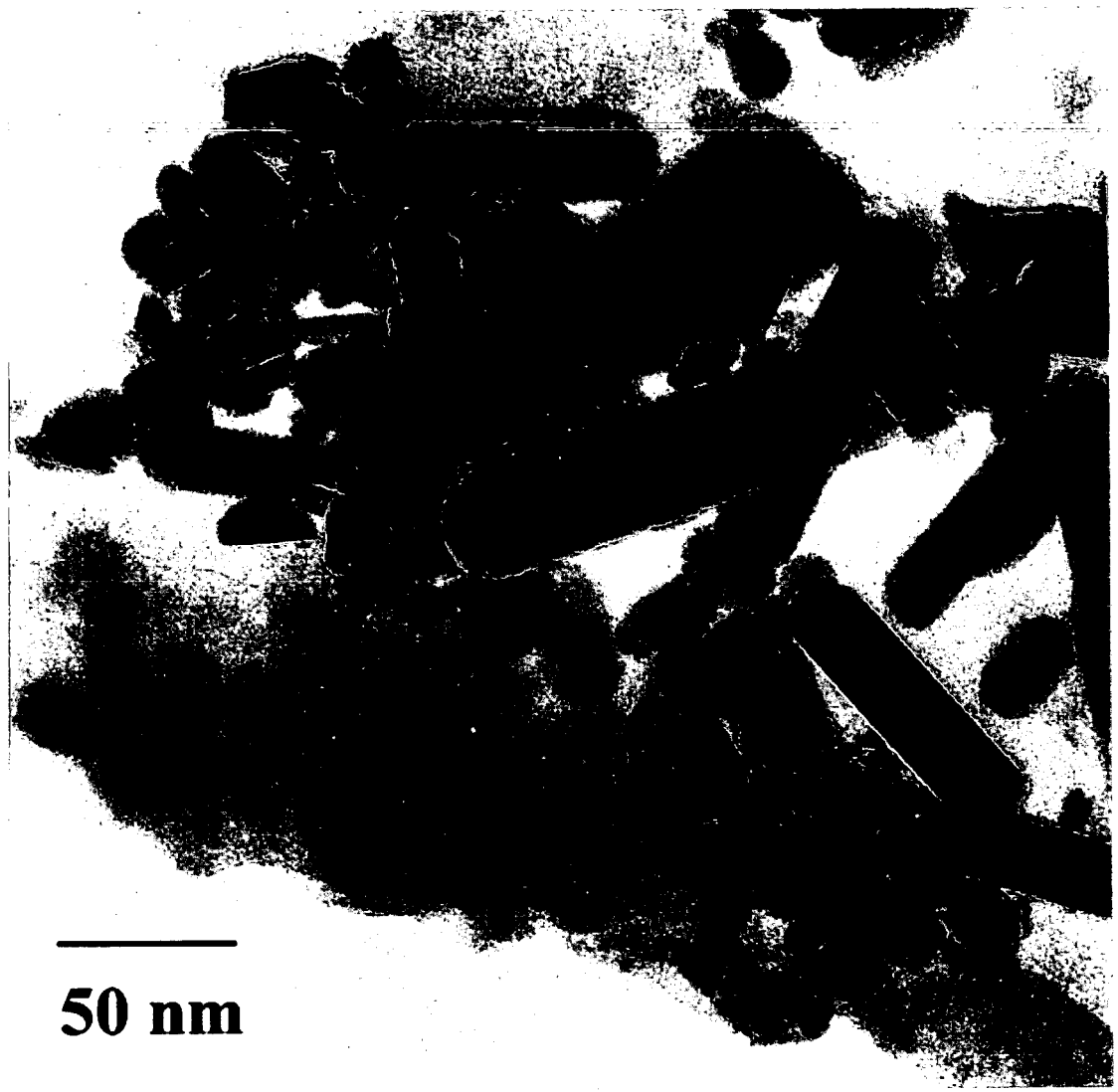
FIG. 4 (a) is a TEM image of In-containing $\epsilon$-Fe$_2$O$_3$ crystals of the present invention.
Figure 4:
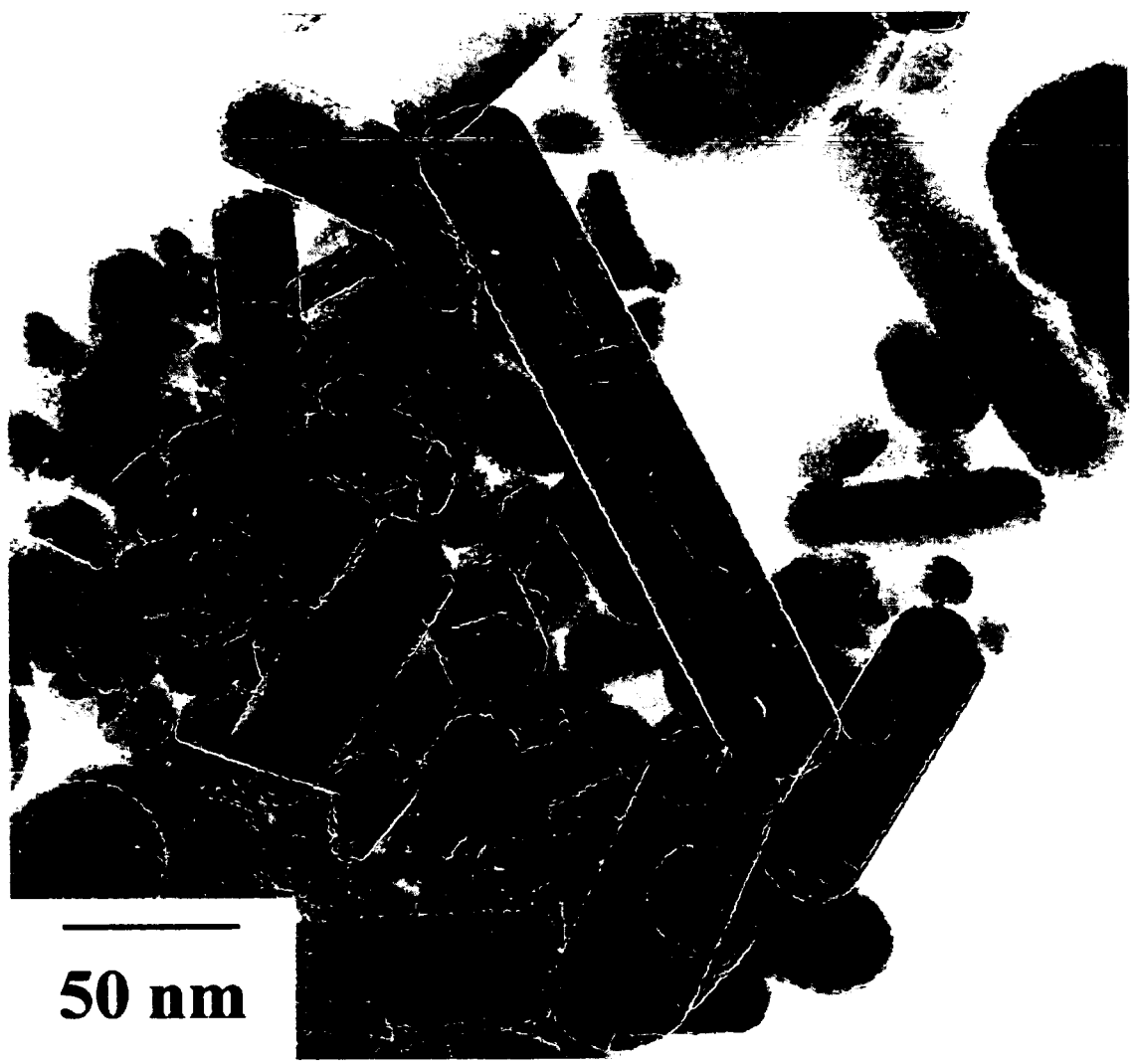
Figure 4:
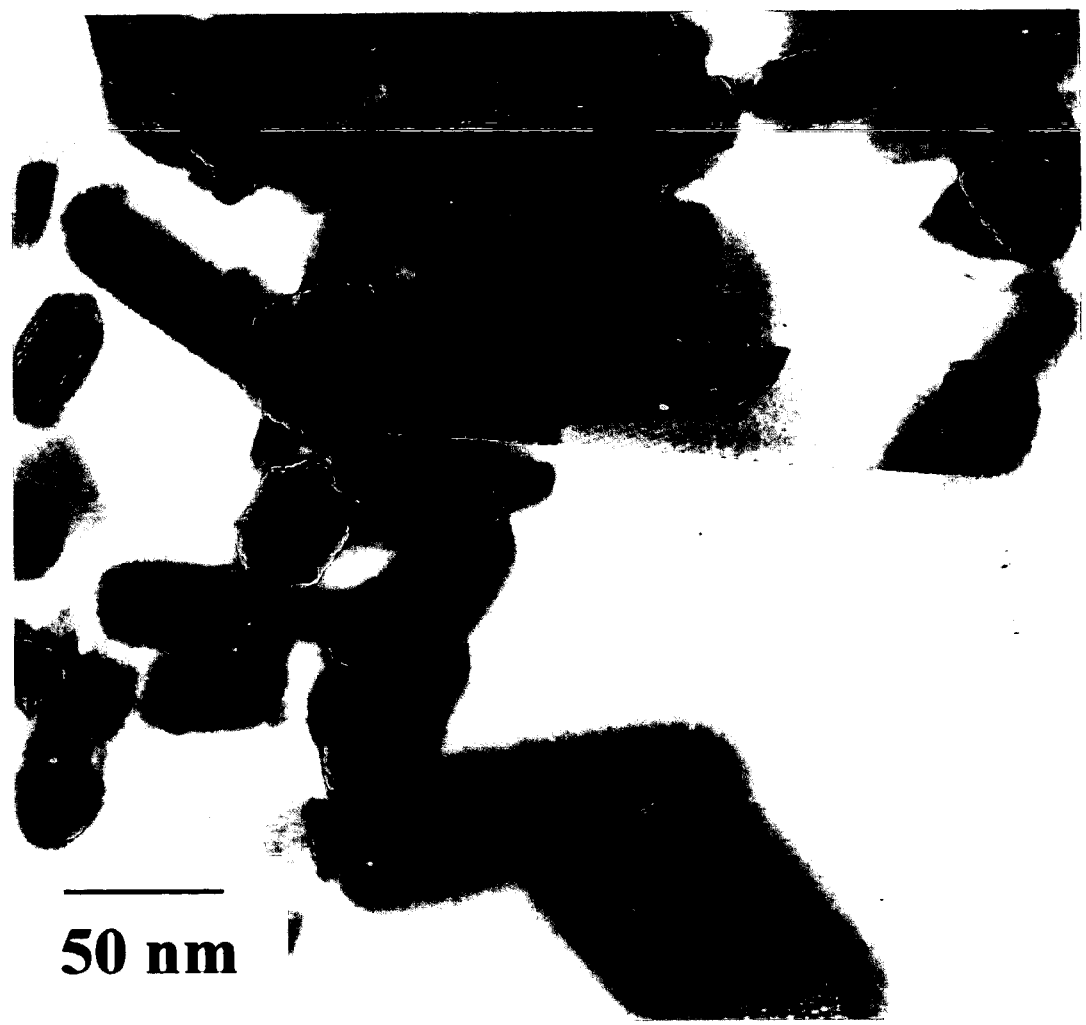

FIGS. 4 (a) and (b) are TEM images of In-containing $\epsilon$-$Fe_2O_3$ crystals described later in Examples 1 and 2. FIG. 4 (c) is a TEM image of $\epsilon$-$Fe_2O_3$ crystals obtained in the Reference Example, also described below. In each case, the particles are rod-shaped microparticles with flat surfaces, indicating a single phase.

Figure 5:
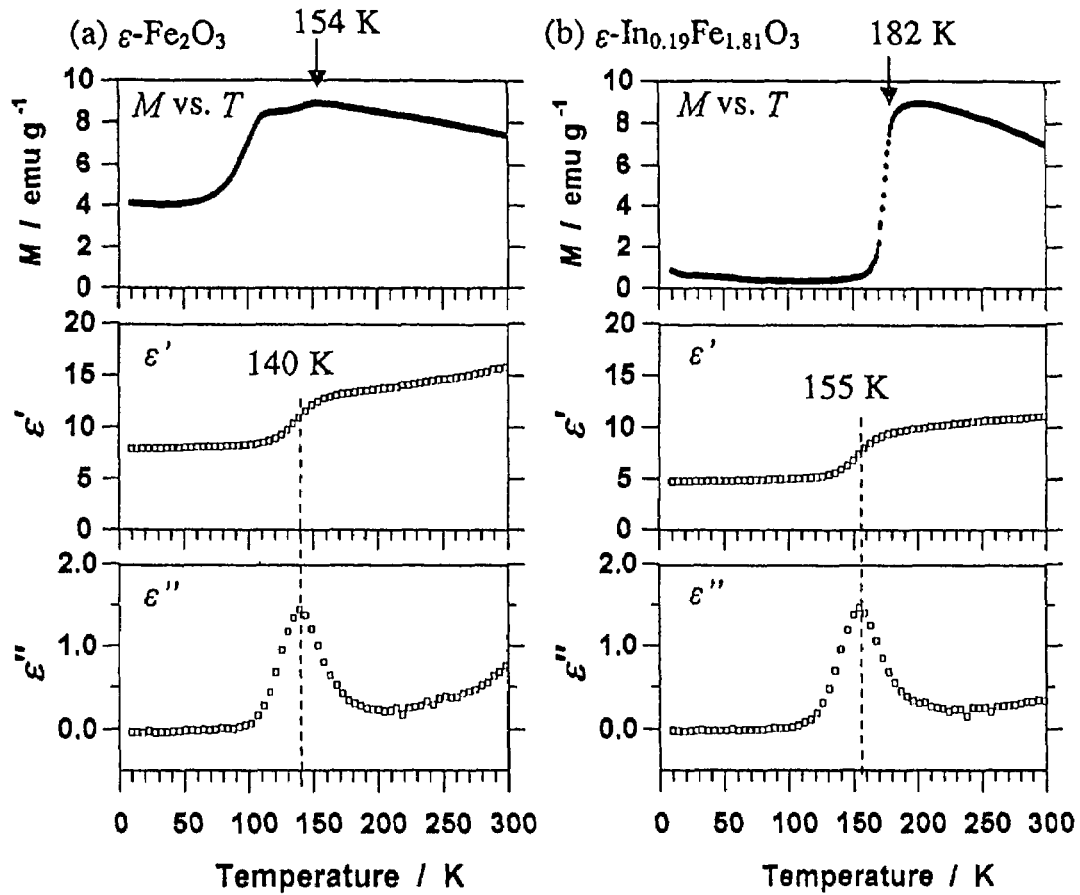
FIG. 5 shows curves of magnetization versus temperature dependency of the complex dielectric constant of In-containing $\epsilon$-Fe$_2$O$_3$ ($\epsilon$-In$_{0.19}$Fe$_{1.81}$O$_3$) of the invention, and of $\epsilon$-Fe$_2$O$_3$.

FIG. 5 shows curves of magnetization versus temperature dependency of the real part $\epsilon'$ and imaginary part $\epsilon''$ of the complex dielectric constant of $\epsilon$-$Fe_2O_3$ and In-containing $\epsilon$-$In_{0.19}Fe_{1.81}O_3$. In the vicinity of the spin reorientation temperature (the top curve in FIG. 5 (a)), the real part $\epsilon'$ of the complex dielectric constant in the case of $\epsilon$-$Fe_2O_3$ shows a decrease of about 30%, accompanied by a peak in the imaginary part $\epsilon''$. In the case of the $\epsilon$-$In_{0.10}Fe_{1.90}O_3$ and $In_{0.19}Fe_{1.81}O_3$ (FIG. 5 (b)), too, a similar $\epsilon'$ change and $\epsilon''$ peak can be observed, with the peak temperature showing an upward shift with the increase in the In substitution amount. Since this shift shows the same tendency as the shift in the spin reorientation temperature, it can be surmised that there is a correlation between the dielectric constant and the spin ordering.

Powder formed of particles of In-containing $\epsilon$-$Fe_2O_3$ crystals having such magnetic properties exhibits a high coercive force in the order of 20 kOe ($1.59 \times 10^6$ A/m), and is also fine, making it applicable as a magnetic material for high-density magnetic recording. The fact that the magnetic phase transition temperature and spin reorientation temperature can be controlled by adjusting the In content, make it an ideal material for thermally-assisted magnetic recording and next-generation magneto optical recording, which are expected to provide ultrahigh-density recording.

As described in the foregoing, the magnetic material of this invention comprises crystals of In-containing $\epsilon$-$Fe_2O_3$ represented by the general formula $\epsilon$-$In_xFe_{2-x}O_3$, in which In is substituted for a portion of the Fe sites of the $\epsilon$-$Fe_2O_3$ crystals. A preferred x value is one that is in the range $0 < x \leq 0.30$. If x=0, the result is a high magnetic phase transition temperature of 495 K (222° C.), making it less than fully applicable for thermally-assisted magnetic recording or magneto-optical recording. On the other hand, an x that is larger than 30 is undesirable, since the In content will be too high and could bring about the collapse of the crystal structure corresponding to $\epsilon$-$Fe_2O_3$, resulting in the synthesis of powder that includes particles that do not have homogeneous compositions. While the ideal composition is one represented by the general formula $\epsilon$-$In_xFe_{2-x}O_3$, the inclusion of other impurities during the manufacturing process is permissible.

For example, in a case in which In-containing $\epsilon$-$Fe_2O_3$ is synthesized by a combination of the reverse micelle method and the sol-gel method, the copresence of an appropriate amount of an alkaline earth metal makes it easier to ultimately obtain the rod-shaped crystals. An alkaline earth metal (such as Ba, Sr, Ca, etc.) added as a shape control agent may remain in the In-containing $\epsilon$-$Fe_2O_3$ crystal particles as an impurity. As well known there exist in polymorphisms such as $\alpha$-$Fe_2O_3$ and $\gamma$-$Fe_2O_3$ which have the same composition as $Fe_2O_3$ but a different crystal structure, and exist also in another iron oxides such as FeO and $Fe_3O_4$. Those other iron oxide phases are permissible in the In-containing $\epsilon$-$Fe_2O_3$ within an amount that does not prevent the effects of the invention. The silica coating formed on the surface of the iron hydroxide microparticles by the sol-gel method may also remain as an impurity in the In-containing $\epsilon$-$Fe_2O_3$ crystal particles after the heat treatment. Depending on the application, the magnetic material used may be comprised of particles of the In-containing $\epsilon$-$Fe_2O_3$ of the invention mixed with particles of $\epsilon$-$Fe_2O_3$.

The preferred particle diameter along the long axis of the particles of In-containing $\epsilon$-$Fe_2O_3$ of the invention, as measured from a transmission electron microscope (TEM) image, is from 5 to 200 nm, more preferably from 10 to 150 nm, and even more preferably from 10 to 100 nm. The particle diameter is the average particle diameter measured based on images of the particles observed using a TEM. The average diameter is obtained by magnifying a TEM image 600,000 times and measuring the largest diameter (the long-axis diameter, in the case of rod-shaped particles) of each of 100 isolated particles in the image. From the standpoint of applying the particles to a magnetic recording medium, it is desirable that the particles be fine particles each having a single domain structure in which the particle diameter in the TEM image is not more than 100 nm.

The magnetic material of this invention has such a huge coercive force at room temperature that if it was used as a magnetic powder to form the magnetic layer of a coating type magnetic recording medium, with the present state of the technology, it would be impossible to obtain, on the market, a magnetic head made of a material having a high enough saturation magnetic flux density to use with the recording medium. However, once a magnetic head is developed that can be used with the magnetic material of the invention, it will be possible to apply the material to coating type magnetic recording media. The In-containing $\epsilon$-$Fe_2O_3$ particles of this invention can be used to form the magnetic layer of a magnetic recording medium by affixing powder particles having a particle diameter of from 5 to 200 nm, as measured along the long axis of the particles from a TEM image, to a substrate, with the easy magnetization axis of the particles at each site oriented in a prescribed direction. That is, the magnetic layer of a magnetic recording medium suitable for high-density recording is obtained by affixing particles of a powder composed of $\epsilon$-$In_xFe_{2-x}O_3$ ($0<x\leq0.30$) in which In is substituted for a portion of the Fe sites of the $\epsilon$-$Fe_2O_3$ crystal that exhibits an X-ray diffraction pattern similar to that of an $\epsilon$-$Fe_2O_3$ crystal structure, having the same space group as that of an $\epsilon$-$Fe_2O_3$, to a substrate with the easy magnetization axis of each particle crystal oriented in a prescribed direction.

On the other hand, in order to obtain a magnetic layer suitable for thermally-assisted magnetic recording or next-generation magneto-optical recording, it is essential that the magnetic material of the layer have the proper magnetic phase transition temperature and spin reorientation temperature. To reiterate what has already been stated with respect to the application of the material of the present invention, the concept of thermally-assisted magnetic recording is that data is recorded on a medium having a high Hc by using a laser to heat the medium to thereby lower the Hc enough to write the data; at room temperature the data, once written, is stably maintained. Thermally-assisted magnetic recording is regarded as the ultrahigh-density magnetic recording technology of the future. In the case of a magneto-optical disc, a laser is used to heat up localized areas of the medium to lower the Hc and enable data to be magnetically written. Stored data is read by projecting a light beam onto the disc and utilizing differences in the polarization angle of the reflected beam due to the direction of magnetization. Thus, it is a magnetic recording system that utilizes the magneto-optical effect.

In both thermally-assisted magnetic recording and magneto-optical recording, the recording medium is repeatedly heated and cooled, so the magnetic material used has to be chemically stable with respect to oxidation corrosion, thermally stable with respect to crystal transformation and crystallization, and have an appropriate optical absorption coefficient, reflectivity and other such properties. Being an oxide, the magnetic material composed of $\epsilon$-$Fe_2O_3$ or In-containing $\epsilon$-$Fe_2O_3$ can fully meet such requirements. The material also meets requirements related to magnetic properties, having a high Hc and a controllable magnetic phase transition temperature, an Hc that drops steeply with the heating up, and a high temperature-dependency.

Particular problems, in the case of thermally-assisted magnetic recording applied to hard disks, are those of the head-disk interface and the heating up of the head. Other problems are that the magnetic head is separated from the disc surface by just several tens of nanometers, and the fact that the disc surface is coated with lubricant to prevent wear to head. In particular, the lubricant is organic, and so its durability may be dramatically decreased if it is subjected to high temperatures for even a short time. The lubricant is usually fluorine based, and although it has a relatively high heat resistance for an organic material, it can only resist temperatures of up to 300° C. (573 K, where 273 K=0° C.). Taking into consideration the repeated heatings it will be subjected to, even if each heating period is very short, it is desirable that its temperature does not exceed 200° C. (473 K). Because such a maximum heating temperature concerns the magnetic phase transition temperature of the recording medium, from the standpoint of the head-disk interface, it is desirable for the recording medium to have a low magnetic phase transition temperature, a requirement that can be met by the magnetic material of the present invention.

It is also important to be able to write to the recording medium at high speed. That is achieved by having the Hc of a medium drop sharply when the medium is heated by the laser beam, and instantaneously increase when the medium cools when the laser is switched off. Again, the magnetic material of this invention is capable of the requisite very rapid Hc changes.

Thermally-assisted magnetic recording and magneto-optical recording media have a magnetic layer consisting of particles of magnetic material affixed to a substrate. Information is recorded on the magnetic layer by magnetization effected by lowering the temperature from a higher side to a lower side of the magnetic phase transition temperature, thereby constituting a magnetic memory. This type of magnetic memory, based on this principle, in which information is recorded on the magnetic layer, has been put into practice in various forms, such as the Magneto-Optical (MO) Disc, the Mini Disc (MD) and some hard disks. The magnetic material of this invention can also be applied to these types of magnetic memory, where it can provide the superior properties described in the foregoing.

In the case of the magnetic material comprised of the In-containing $\epsilon$-$Fe_2O_3$ of this invention in which a portion of the Fe has been replaced by In, the spin reorientation temperature is clearly manifested in the magnetic properties. Specifically, the magnetic properties change sharply on each side of the spin reorientation temperature. While the spin reorientation temperature depends on the In content, it is manifested in low, subzero temperature regions. This makes the magnetic material ideal for constructing high-performance temperature sensors that detect temperature changes in a low-temperature region at the boundary in a given temperature. The sensor is equipped with means for measuring the magnetization of the magnetic material. The measurement means can use a conventional method. In the case the data of FIG. 2 were measured, for example, a temperature sensor in the spin reorientation temperature region can be regarded as being constructed by "the samples of the magnetic material" used at the time the data were measured and "the measuring means" that measured the intensity of the magnetization of the samples.

Thus, in addition to being useful for applications such as high-density magnetic recording media and low-temperature sensors, the stable oxide nature and superior magnetic properties of the magnetic material of the present invention enable it to be used for many applications, including as an electromagnetic wave absorption materials, a nanoscale electronics material, a permanent magnet material, a biomolecular marker agent, a drug carrier, and a temperature sensor.

The synthesis of the In-containing $\epsilon$-$Fe_2O_3$ particles of the invention has been described in the foregoing with reference to the use of a reverse micelle method to fabricate the precursor iron hydroxide and indium hydroxide nanoparticles. However, the fabrication method is not limited to the reverse micelle method, if the precursors measuring up to 100 nm can be fabricated by another method. Similarly, while the use of the sol-gel method has been described with reference to providing the precursor particles with a heat-resistant silica coating, the fabrication of the coating is not limited to the sol-gel method. For example, the In-containing $\epsilon$-$Fe_2O_3$ particles can be synthesized with a heat-resistant coating formed of alumina or zirconia or the like, and subjecting the coating to heat treatment at a prescribed temperature.

Example 1

In this example, $\epsilon$-In$_{0.12}$Fe$_{1.88}$O$_3$ was synthesized.

Step 1

A micelle solution I and a micelle solution II are prepared.

Preparation of Micelle Solution I 6 ml of pure water, 18.3 ml of n-octane and 3.7 ml of 1-butanol were put into a Teflon™ flask, to which were added 0.00287 mol of iron (III) nitrate 9-hydrate, 0.000135 mol of indium (III) nitrate 3-hydrate and 0.0003 mol of barium nitrate, and the solution dissolved at room temperature while being vigorously stirred. A surfactant consisting of cetyl trimethyl ammonium bromide was added in an amount that brought the water/surfactant mol ratio to 30, and the solution stirred to dissolve it, thereby obtaining the micelle solution I. The charged composition had been intended to correspond to those shown as a formula of In$_{0.09}$Fe$_{1.91}$O$_3$.

Preparation of Micelle Solution II 2 ml of a 25% solution of aqueous ammonia was stirred into 4 ml of pure water. This was followed by the addition of 18.3 ml of n-octane and 3.7 ml of 1-butanol, and the solution was vigorously stirred. A surfactant consisting of cetyl trimethyl ammonium bromide was then added and dissolved therein in an amount that brought the (pure water+water existing in the aqueous ammonia)/surfactant mol ratio to 30, to thereby obtain the micelle solution II.

Step 2

The micelle solution II was then dropped into the micelle solution I under stirring. After this was completed, the mixed solution continued to be stirred for 30 minutes.

Step 3

1.5 ml of tetraethoxysilane was added to the mixed solution obtained in Step 2 while stirring the mixture. The solution continued to be stirred for about one day.

Step 4

The solution obtained by Step 3 was centrifuged and the solid component thus separated was recovered and washed a plurality of times using a mixed solution of chloroform and methanol.

Step 5

After the solid component obtained in Step 4 was dried, it was placed in a furnace and subjected to 4 hours of heat treatment at 1000° C. in air.

Step 6

Powder obtained by the heat treatment of Step 5 was added and stirred for 24 hours in one liter of 2 mol/l aqueous solution of NaOH to remove any silica that might be present on the surface of the particles. The particles were then filtered, washed and dried.

The above Steps 1 to 6 were used to obtain the target sample.

The sample thus obtained was measured by a powder X-ray diffraction spectrometer (XRD: Rigaku Corporation, RINT 2000, using CuKα radiation at a voltage of 40 kV and a current of 30 mA), resulting in the diffraction pattern shown in the center of FIG. 1. The peaks exhibited by this diffraction pattern correspond to those of the diffraction pattern of the $\epsilon$-Fe$_2$O$_3$ crystal structure (orthorhombic, space group Pna2$_1$), shown at the top of FIG. 1. The calculated lattice constants of the sample were: a axis: 5.12 Å, b axis: 8.81 Å, c axis 9.49 Å.

Fluorescence X-ray analysis (JEOL Ltd. JSX-3220) confirmed the composition of the sample to be $\epsilon$-In$_{0.12}$Fe$_{1.88}$O$_3$. Rod-shaped particles having a length of 55.12 nm and a width of 21.11 nm were observed in a TEM image (JEOL Ltd. JEM 2000 EXII). The TEM image is shown in FIG. 4 (*a*). The cooling magnetization curve of the sample in a magnetic field was measured; the result is shown in FIG. 2, and the results of measurements of the magnetic phase transition temperature and the spin reorientation temperature are shown in Table 1. The measurements were made using a superconducting quantum interference device magnetometer (SQUID: Quantum Design MPMS7).

Example 2

In this example, $\epsilon$-In$_{0.18}$Fe$_{1.82}$O$_3$ was synthesized.

This was done by the same procedure as Example 1, except that in the preparation of the micelle solution I, the amount of iron (III) nitrate 9-hydrate added was changed from 0.00287 mol to 0.00273 mol, and the amount of indium (III) nitrate 3-hydrate added was changed from 0.000135 mol to 0.00037 mol. The charged composition had been intended to correspond to those shown as a formula of In$_{0.18}$Fe$_{1.82}$O$_3$.

The sample thus obtained was measured by powder X-ray diffraction, resulting in the diffraction pattern shown at the bottom of FIG. 1. The peaks exhibited by this diffraction pattern correspond to those of the diffraction pattern of the $\epsilon$-Fe$_2$O$_3$ crystal structure shown at the top of FIG. 1 (orthorhombic, space group Pna2$_1$). The calculated lattice constants of the sample were: a axis: 5.15 Å, b axis: 8.84 Å, c axis 9.53 Å.

Fluorescence X-ray analysis confirmed the composition of the sample to be $\epsilon$-In$_{0.18}$Fe$_{1.82}$O$_3$. Rod-shaped particles having a length of 53.06 nm and a width of 23.0 nm were observed in a TEM image. The TEM image is shown in FIG. 4 (*b*). The cooling magnetization curve of the sample in a magnetic field was measured; the result is shown in FIG. 2, and the results of measurements of the magnetic phase transition temperature and the spin reorientation temperature are shown in Table 1.

REFERENCE EXAMPLE

In this example, $\epsilon$-Fe$_2$O$_3$ was synthesized.

This was done by the same procedure as Example 1, except that in the preparation of the micelle solution I, the amount of iron (III) nitrate 9-hydrate added was 0.0030 mol, and no indium (III) nitrate 3-hydrate was added.

The sample thus obtained was measured by powder X-ray diffraction, resulting in the diffraction pattern shown at the top of FIG. 1. The calculated lattice constants of the sample were: a axis: 5.10 Å, b axis: 8.81 Å, c axis 9.47 Å.

Fluorescence X-ray analysis confirmed the composition of the sample to be $\epsilon$-Fe$_2$O$_3$. Rod-shaped particles having a length of 98.5 nm and a width of 31.4 nm were observed in a TEM image. The TEM image is shown in FIG. 4 (*c*). The cooling magnetization curve of the sample in a magnetic field was measured; the result is shown in FIG. 2, and the results of measurements of the magnetic phase transition temperature and the spin reorientation temperature are shown in Table 1.

TABLE 1

| Product | Magnetic phase transition temperature (K) | Spin reorientation temperature (K) |
| --- | --- | --- |
| $\epsilon$-Fe$_2$O$_3$ | 495 | 154 |
| $\epsilon$-In$_{0.12}$Fe$_{1.88}$O$_3$ | 470 | 170 |
| $\epsilon$-In$_{0.18}$Fe$_{1.82}$O$_3$ | 422 | 192 |

Based on the results shown in Table 1 and FIG. 2, a higher x value in the formula $\epsilon\text{-In}_x\text{Fe}_{2-x}\text{O}_3$ ($0<x\leqq 0.30$), results in a lower magnetic phase transition temperature, a higher spin reorientation temperature and a larger lattice constant.

Example 3

In this example, $\epsilon\text{-In}_{0.19}\text{Fe}_{1.81}\text{O}_3$ was synthesized.

This was done by the same procedure as Example 1, except that in the preparation of the micelle solution I, the amount of iron (III) nitrate 9-hydrate added was changed from 0.00287 mol to 0.002715 mol, and the amount of indium (III) nitrate 3-hydrate added was changed from 0.000135 mol to 0.000285 mol. The charged composition had been intended to correspond to those shown as a formula of $\text{In}_{0.19}\text{Fe}_{1.81}\text{O}_3$.

The sample thus obtained was measured by powder X-ray diffraction, resulting in a diffraction pattern showing the sample to have a crystal structure similar to the $\epsilon\text{-Fe}_2\text{O}_3$ of the Reference Example (orthorhombic, space group Pna2$_1$). Fluorescence X-ray analysis confirmed the composition of the sample to be $\epsilon\text{-In}_{0.19}\text{Fe}_{1.81}\text{O}_3$.

The cooling magnetization curve of the sample in a magnetic field was measured; the result is shown at the top of FIG. 5 (b) (just the portion up to 300 K). The spin reorientation temperature of the sample was 182 K. The corresponding magnetization curve of the $\epsilon\text{-Fe}_2\text{O}_3$ of the Reference Example is shown at the top of FIG. 5 (a). A comparison of these show that the In substitution increases the spin reorientation temperature and produces a very steep change in the magnetization at the spin reorientation temperature.

Figure 6:
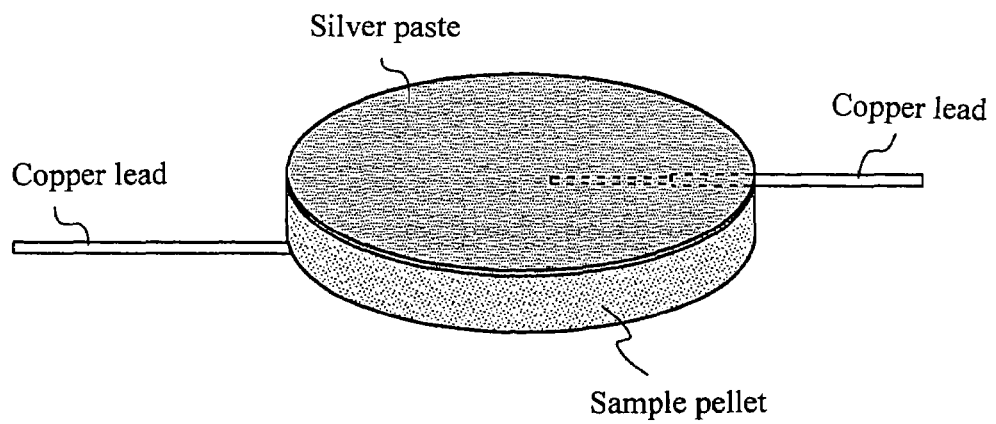
FIG. 6 is a diagram of a capacitor used for measurements.

Next, the temperature dependency of the complex dielectric constant of the sample was investigated. A measurement sample was prepared by using an SSP-10A hand-press made by Shimadzu Corporation to form a pellet 5 mm in diameter by pressing the material for 1 hour at a pressure of 60 kN. Both sides of the pellet were coated with silver paste which was dried to function as electrodes, thereby forming a plane-parallel plate capacitor. A copper lead was positioned on each electrode and coated with silver paste to form terminals. The capacitor was covered with Kapton tape to keep the copper leads in place, thereby making this a measuring capacitor (FIG. 6). A ZM 2353 LCR meter manufactured by NF Corporation was used to measure the dielectric constant. This was done using a measurement frequency of 100 kHz and a measurement signal level of 1 Vrm. A PPMS manufactured by Quantum Design Inc. was used to control the temperature and the external magnetic field; the magnetic field was applied perpendicular to the electrode plane.

The results of the measurement of the temperature dependency of the complex dielectric constant are shown in the middle and bottom of FIG. 5 (b). The same measurements were conducted with respect to the $\epsilon\text{-Fe}_2\text{O}_3$ of the Reference Example; the results are shown in the middle and bottom of FIG. 5 (a). In FIG. 5, the middle curves show the real part $\epsilon'$ of the complex dielectric constant in each case, and the bottom curves show the imaginary part $\epsilon''$. As described in the above, in the case of both $\epsilon\text{-Fe}_2\text{O}_3$ and $\epsilon\text{-In}_{1.19}\text{Fe}_{1.81}\text{O}_3$, a peak was observed at the imaginary part $\epsilon''$, showing that the peak temperature is elevated by the In substitution.

Figure 7:
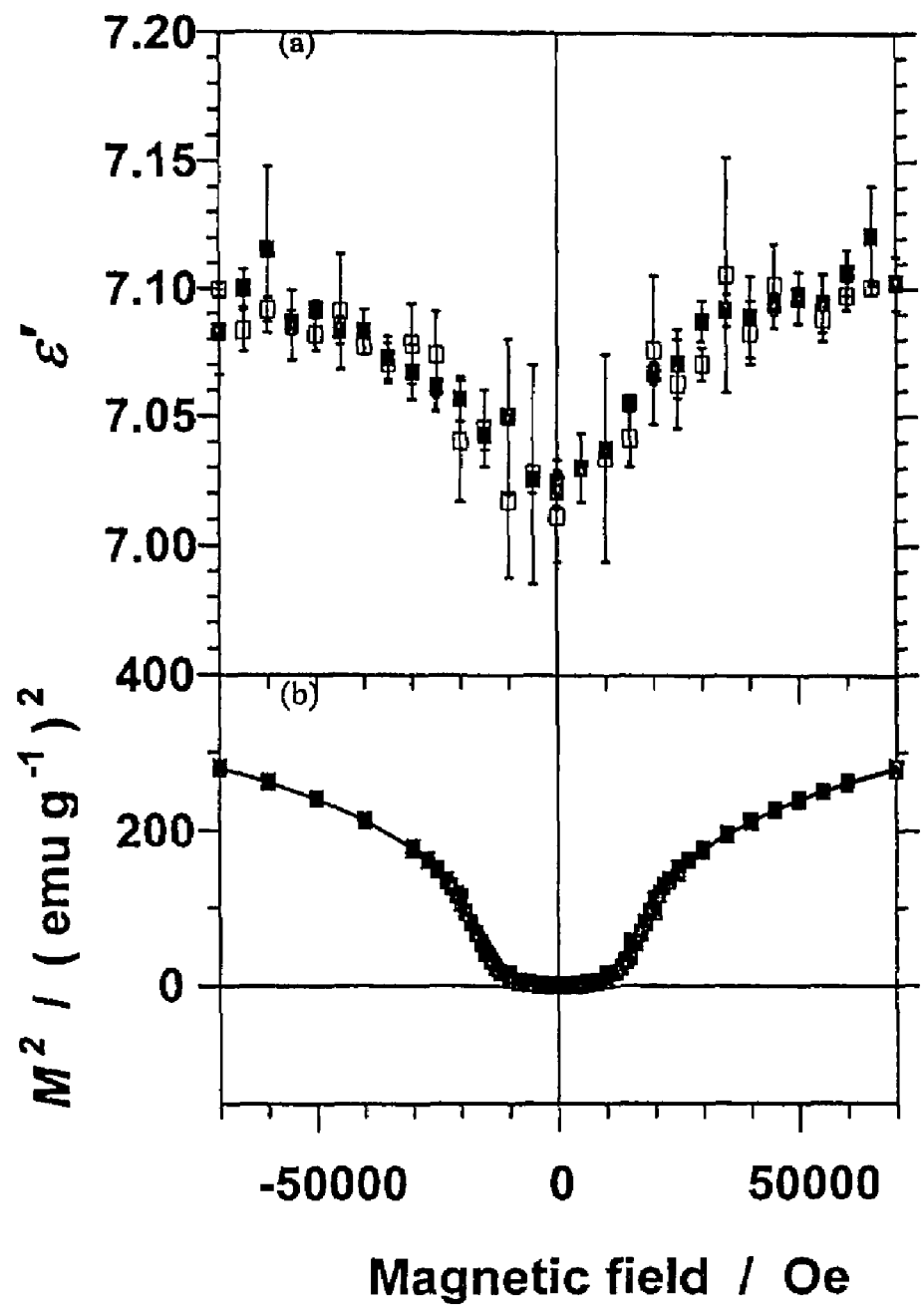
FIG. 7 shows curves of dependency of external magnetic field $\epsilon'$ (at 155 K and 100 kHz) and (magnetization M)$^2$—magnetic field in respect of In-containing $\epsilon$-Fe$_2$O$_3$ ($\epsilon$-In$_{0.19}$Fe$_{1.81}$O$_3$) of the invention.

FIG. 7 shows curve of the dependency of $\epsilon'$ for external magnetic field (at 155 K and 100 kHz) and curve of (magnetization M)$^2$—magnetic field. Measurement of the magnetic field dependency of $\epsilon'$ at 155 K where the $\epsilon\text{-In}_{0.19}\text{Fe}_{1.81}\text{O}_3$ exhibits a peak at $\epsilon''$ showed that the value of $\epsilon'$ was increased 1.3% by the application of a 70 kOe magnetic field (FIG. 7 (a)). The change in $\epsilon'$ caused by the this field is analogous to the (magnetization M)$^2$ vs. magnetization curve (FIG. 7 (b)), and is considered to be manifested by the magnetoelectric polarization interaction ($\Delta\epsilon \propto M^2$) explained by the Ginzburg-Landau theory.

What is claimed is:

1. A magnetic material composed of $\epsilon\text{-In}_x\text{Fe}_{2-x}\text{O}_3$ (wherein $0<x\leqq 0.30$) in which In is substituted for a portion of the Fe sites of the $\epsilon\text{-Fe}_2\text{O}_3$ crystal, that has the same space group as that of an $\epsilon\text{-Fe}_2\text{O}_3$ crystal.

2. The magnetic material according to claim 1, wherein a magnetic phase transition temperature thereof is lower than a magnetic phase transition temperature of the $\epsilon\text{-Fe}_2\text{O}_3$.

3. The magnetic material according to claim 1, wherein a spin reorientation temperature thereof is higher than a spin reorientation temperature of the $\epsilon\text{-Fe}_2\text{O}_3$.

4. The magnetic material according to claim 1, comprised of microparticles having a single domain structure.

5. The magnetic material according to claim 1, comprised of microparticles having a particle diameter along the long axis of the particles, as measured from a transmission electron microscope image, that is from 5 to 200 nm.

6. A magnetic layer of a magnetic recording medium comprised of microparticles of the magnetic material of claim 1, each having a particle diameter along the axis of the particles, as measured from a transmission electron microscope image, that is from 5 to 200 nm, being each affixed to a particle site on a substrate.

7. A magnetic layer of a magnetic recording medium comprised of microparticles of the magnetic material of claim 1, each having a particle diameter along the long axis of the particles, as measured from a transmission electron microscope image, that is from 5 to 200 nm, being each affixed to a particle site on a substrate with the easy axis of magnetization of the particles at each site oriented in a prescribed direction.

8. The magnetic material according to claim 1, wherein a peak temperature of an imaginary part of a complex dielectric constant thereof is higher than that of $\epsilon\text{-Fe}_2\text{O}_3$.

9. A magnetic memory having a magnetic layer comprised of particles of the magnetic material of claim 1 affixed to a substrate, wherein information is recorded on the magnetic layer using a magnetization method in which the magnetic material constituting the magnetic layer is magnetized at a process step of a temperature being lowered from a higher side to a lower side of its magnetic phase transition temperature.

10. A temperature sensor comprising the magnetic material of claim 1 and means for measuring a magnetization intensity of the material, which detects temperature changes relative to the spin reorientation temperature of the material, using the material's characteristics that the magnetic properties are changed drastically at the spin reorientation temperature.

11. The magnetic material according to claim 2, wherein a spin reorientation temperature thereof is higher than a spin reorientation temperature of the $\epsilon\text{-Fe}_2\text{O}_3$.

* * * * *

UNITED STATES PATENT AND TRADEMARK OFFICE
CERTIFICATE OF CORRECTION

| | |
|---|---|
| PATENT NO. | : 7,708,902 B2 |
| APPLICATION NO. | : 11/521395 |
| DATED | : May 4, 2010 |
| INVENTOR(S) | : Shin-ichi Ohkoshi et al. |

It is certified that error appears in the above-identified patent and that said Letters Patent is hereby corrected as shown below:

Title Page; item (73);

The Assignees should be listed as:

The University of Tokyo, Tokyo, JP
AND
Dowa Electronics Materials Co., Ltd., Tokyo, JP Signed and Sealed this
Sixth Day of September, 2011

David J. Kappos
*Director of the United States Patent and Trademark Office*